(12) United States Patent
Shimokawa

(10) Patent No.: US 9,545,928 B2
(45) Date of Patent: Jan. 17, 2017

(54) VEHICLE TRAVEL CONTROL APPARATUS

(71) Applicant: TOYOTA JIDOSHA KABUSHIKI KAISHA, Toyota-shi, Aichi (JP)

(72) Inventor: Shinnosuke Shimokawa, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 7 days.

(21) Appl. No.: 14/821,076

(22) Filed: Aug. 7, 2015

(65) Prior Publication Data

US 2016/0039416 A1 Feb. 11, 2016

(30) Foreign Application Priority Data

Aug. 7, 2014 (JP) ................................. 2014-161739

(51) Int. Cl.
| | |
|---|---|
| B60W 10/16 | (2012.01) |
| B60W 10/184 | (2012.01) |
| B60W 10/20 | (2006.01) |
| B60W 30/182 | (2012.01) |
| B62D 37/02 | (2006.01) |
| B60W 10/18 | (2012.01) |
| B60W 30/02 | (2012.01) |
| B62D 35/00 | (2006.01) |
| B60W 50/00 | (2006.01) |

(52) U.S. Cl.
CPC ............ *B60W 30/182* (2013.01); *B60W 10/18* (2013.01); *B60W 10/20* (2013.01); *B60W 30/02* (2013.01); *B62D 35/007* (2013.01); *B62D 37/02* (2013.01); *B60W 10/16* (2013.01); *B60W 10/184* (2013.01); *B60W 2050/0013* (2013.01); *B60W 2550/12* (2013.01); *B60W 2720/14* (2013.01)

(58) Field of Classification Search
None
See application file for complete search history.

(56) References Cited

U.S. PATENT DOCUMENTS

| | | | |
|---|---|---|---|
| 7,360,615 B2* | 4/2008 | Salman ................... | B60K 6/52 |
| | | | 180/65.265 |
| 8,306,720 B2* | 11/2012 | Yamazaki .............. | B60K 6/445 |
| | | | 123/520 |

(Continued)

FOREIGN PATENT DOCUMENTS

| | | |
|---|---|---|
| JP | 3463375 B | 11/2003 |
| JP | 2008-68815 A | 3/2008 |

(Continued)

*Primary Examiner* — Shelley Chen
(74) *Attorney, Agent, or Firm* — Sughrue Mion, PLLC

(57) ABSTRACT

In a vehicle including a plurality of devices (14, 16, 60, and 70 to 74) for operating so as to cause a yaw rate of the vehicle to approach a target yaw rate, a target control amount $\Delta\gamma t$ for the yaw rate for causing a yaw rate $\gamma$ of the vehicle to approach a target yaw rate $\gamma t$ is calculated (S20 to S60), for each device, a ratio of a change amount of the yaw rate to an energy loss amount caused by an operation is calculated as an efficiency (S80 to S100), the target control amount is sequentially distributed to the plurality of devices in descending order of the efficiency, to thereby calculate individual target control amounts for the plurality of devices (S110 to S160), and the operations of the respective devices are controlled based on the individual target control amounts (S170).

5 Claims, 5 Drawing Sheets

(56) References Cited

U.S. PATENT DOCUMENTS

| | | | | |
|---|---|---|---|---|
| 8,311,694 B2* | 11/2012 | Imai | ................. | B60K 6/445 |
| | | | | 180/65.1 |
| 8,909,404 B2* | 12/2014 | Crombez | ............. | B60W 10/06 |
| | | | | 340/439 |
| 9,434,371 B2* | 9/2016 | Muta | ................. | B60W 10/06 |
| 2004/0098984 A1* | 5/2004 | Duell | ................. | E02F 9/2235 |
| | | | | 60/431 |
| 2007/0298928 A1* | 12/2007 | Yamanaka | ............... | B60K 6/40 |
| | | | | 477/15 |
| 2010/0138090 A1* | 6/2010 | Jinno | ................ | B60K 6/448 |
| | | | | 701/22 |
| 2011/0251747 A1* | 10/2011 | Imai | ................. | B60K 6/445 |
| | | | | 701/22 |
| 2011/0300983 A1* | 12/2011 | Kurokawa | ............ | B60K 6/365 |
| | | | | 475/5 |
| 2012/0053751 A1* | 3/2012 | Borresen | ............... | G05B 13/04 |
| | | | | 700/297 |
| 2012/0173066 A1* | 7/2012 | Yamada | ............ | B60L 11/1803 |
| | | | | 701/22 |
| 2014/0277874 A1* | 9/2014 | Crombez | ............ | B60W 10/06 |
| | | | | 701/22 |
| 2016/0001660 A1* | 1/2016 | Tomura | ................ | H02J 1/00 |
| | | | | 307/10.1 |

FOREIGN PATENT DOCUMENTS

| | | | |
|---|---|---|---|
| JP | 2008155820 A | * | 7/2008 |
| JP | 4483860 B2 | * | 6/2010 |

* cited by examiner

VEHICLE TRAVEL CONTROL APPARATUS

BACKGROUND OF THE INVENTION

1. Field of the Invention

The present invention relates to a vehicle travel control apparatus, and more particularly, to a vehicle travel control apparatus including a plurality of travel motion state control devices for operating so as to cause a travel motion state of a vehicle to approach a target travel motion state.

2. Description of the Related Art

When the vehicle receives an external force during travel, the travel motion state of the vehicle deviates from a target travel motion state. For example, when the vehicle receives a crosswind during the travel, a leeward lateral force acts on the vehicle, and a yaw moment deflecting a travel direction of the vehicle leeward is generated by the action of the lateral force, and an unnecessary yaw rate is thus generated on the vehicle.

There have been known various travel motion state control devices for operating so as to cause the vehicle travel motion state to approach the target travel motion state, thereby preventing the travel motion state of the vehicle from deviating from the target travel motion state. Those travel motion state control devices provide a braking/driving force difference between left and right wheels, or increase slip angles of the wheels to increase cornering forces of the wheels, to thereby generate a control yaw moment against the yaw moment caused by the external force acting on the vehicle. Moreover, there has also been known a travel motion state control device for using an aerodynamic force to generate the control yaw moment.

For example, in Japanese Patent No. 3463375, there is disclosed a control device for using control of distributing a driving force between the left and right wheels and an aerodynamic device such as side air spoilers, thereby generating and controlling the control yaw moment against the yaw moment caused by the crosswind.

An energy is required to operate the travel motion state control devices. In addition, a travel resistance of the vehicle is increased, for example, due to an increase in rolling resistances of the wheels or an air resistance of the vehicle, which results from the operations of the travel motion state control devices. A loss of energy is generated by those factors. Even a device highest in an effect of controlling the travel motion state may have a large loss in the energy, and the control effect and the loss in the energy change depending on the travel state of the vehicle and the state of the external force.

However, the related-art vehicle travel control apparatus including the plurality of travel motion state control devices capable of generating the control yaw moment controls the travel motion state by using a device or combination of devices highest in the control effect. As a result, even if the travel motion state of the vehicle can be effectively controlled, energy efficiency of the control of the travel motion state may deteriorate, resulting in deterioration of fuel efficiency of the entire vehicle.

SUMMARY OF THE INVENTION

The present invention has been made in view of the above-mentioned problem in the related-art vehicle travel control apparatus including the plurality of travel motion state control devices capable of generating the control yaw moment. Therefore, a primary object of the present invention is to attain a high effect in control of a travel motion state at a small loss of energy by optimally operating a plurality of travel motion state control devices based both on a control effect of the travel motion state and on a loss in the energy.

In order to achieve the above-mentioned primary object, the present invention provides a vehicle travel control apparatus, including: a plurality of travel motion state control devices for operating so as to cause a travel motion state of a vehicle to approach a target travel motion state; and control unit for controlling the operations of the plurality of travel motion state control devices, in which the control unit calculates a control amount for causing the travel motion state of the vehicle to approach the target travel motion state as a target control amount for the entire vehicle, sequentially distributes, while setting a ratio of a change amount of the travel motion state to an energy loss amount caused by the operation of each of the plurality of travel motion state control devices as an efficiency, the target control amount for the entire vehicle to the plurality of travel motion state control devices in descending order of the efficiency, to thereby calculate individual target control amounts for the plurality of travel motion state control devices, and controls the operation of the each of the plurality of travel motion state control devices based on each of the individual target control amounts.

According to the above-mentioned configuration, the control amount for causing the travel motion state of the vehicle to approach the target travel motion state is calculated as the target control amount for the entire vehicle. Moreover, by distributing, in descending order of the ratio of the change amount of the travel motion state to the energy loss amount caused by the operation of each travel motion state control device, namely, the efficiency, the target control amount for the entire vehicle to the plurality of the travel motion state control devices, the individual target control amounts are calculated for the plurality of travel motion state control devices. Further, the operation of each travel motion state control device is controlled based on the individual target control amount.

Thus, the target control amount for the entire vehicle can sequentially be distributed to the plurality of travel motion state control devices so that the priority increases as the efficiency increases. Thus, compared with the related-art travel control device that does not consider the energy loss caused by the operation of the travel motion state control device, the ratio of the change amount of the travel motion state to the energy loss amount can be increased when the travel motion state of the vehicle is caused to approach the target travel motion state. In other words, the travel motion state of the vehicle can be caused to approach the target travel motion state with as small an energy loss amount as possible, and as effectively as possible.

According to the one embodiment of the present invention, in the above-mentioned configuration, the control unit may calculate, based on a travel state of the vehicle and an operation state of the each of the plurality of travel motion state control devices, the energy loss amount and the change amount of the travel motion state that are obtained when the each of the plurality of travel motion state control devices is operated at a control amount, which is set in advance.

According to the above-mentioned configuration, the efficiency of each travel motion state control device can be calculated based on the travel state of the vehicle and the operation state of each travel motion state control device. Thus, even when the travel state of the vehicle and the operation state of each travel motion state control device change, the efficiency of each travel motion state control device can be precisely calculated. It should be noted that the calculation based on this configuration is achieved by Steps 80 and 90 in the following embodiment.

Further, according to the one embodiment of the present invention, in the above-mentioned configuration, the control unit may be configured to: set, when the target control amount for the entire vehicle is not more than a maximum value that is distributable to one of the plurality of travel motion state control devices highest in the efficiency, the target control amount for the entire vehicle to the individual target control amount for the one of the plurality of travel motion state control devices; and distribute, when the target control amount for the entire vehicle is more than the maximum value that is distributable to the one of the plurality of travel motion state control devices highest in the efficiency, a difference between the target control amount for the entire vehicle and the maximum value, as a residual target control amount, to another of the plurality of travel motion state control devices second highest in the efficiency.

According to the above-mentioned configuration, when the target control amount of the entire vehicle is not larger than the maximum value that is distributable to the travel motion state control device highest in the efficiency, the target control amount for the entire vehicle can be distributed to the travel motion state control device highest in the efficiency. Thus, the target control amount for the entire vehicle can be prevented from being distributed to the travel motion state control devices other than the travel motion state control device highest in the efficiency. Thus, the ratio of the change amount of the travel motion state to the energy loss amount can be prevented from decreasing when the travel motion state of the vehicle is caused to approach the target travel motion state.

Moreover, when the target control amount for the entire vehicle is larger than the maximum value that is distributable to the travel motion state control device highest in the efficiency, the difference between the target control amount for the entire vehicle and the maximum value is distributed as the residual target control amount to the travel motion state control device second highest in the efficiency. Thus, compared with the case in which the residual target control amount is not distributed to the travel motion state control device second highest in the efficiency, the effect of the control of causing the travel motion state of the vehicle to approach the target travel motion state can be positively increased.

Further, according to the one embodiment of the present invention, in the above-mentioned configuration, when the descending order of the efficiency changes, the control unit limits a change in the individual target control amount for the each of the plurality of travel motion state control devices before and after the change.

According to the above-mentioned configuration, when the descending order of the efficiency changes, the change in the individual target control amount of each travel motion state control device is limited before and after the change, and hence the individual target control amount of each travel motion state control device can be prevented from being changed suddenly before and after the change. Thus, even when the descending order of the efficiency changes, the control of causing the travel motion state of the vehicle to approach the target travel motion state can be stably carried out.

Further, according to the one embodiment of the present invention, in the above-mentioned configuration, the travel motion state of the vehicle may be a yaw rate of the vehicle, and the target travel motion state may be a target yaw rate of the vehicle.

According to the above-mentioned configuration, the yaw rate of the vehicle can be caused to approach the target yaw rate of the vehicle, and the ratio of the change amount of the travel motion state to the energy loss amount when the yaw rate of the vehicle is controlled can be increased.

Further, according to the one embodiment of the present invention, in the above-mentioned configuration, the plurality of travel motion state control devices may include any of a device for controlling a steering angle of a front wheel, a device for controlling a steering angle of a rear wheel, a device for controlling a braking/driving force difference between a left wheel and a right wheel, and a device for using an aerodynamic force to control a yaw moment of the vehicle.

According to the above-mentioned configuration, any of the device for controlling the steering angle of the front wheel, the device for controlling the steering angle of the rear wheel, the device for controlling the braking/driving force difference between the left and right wheels, and the device for using the aerodynamic force to control the yaw moment of the vehicle can be used so as to cause the travel motion state of the vehicle to approach the target travel motion state.

DETAILED DESCRIPTION OF THE PREFERRED EMBODIMENTS

Figure 1:
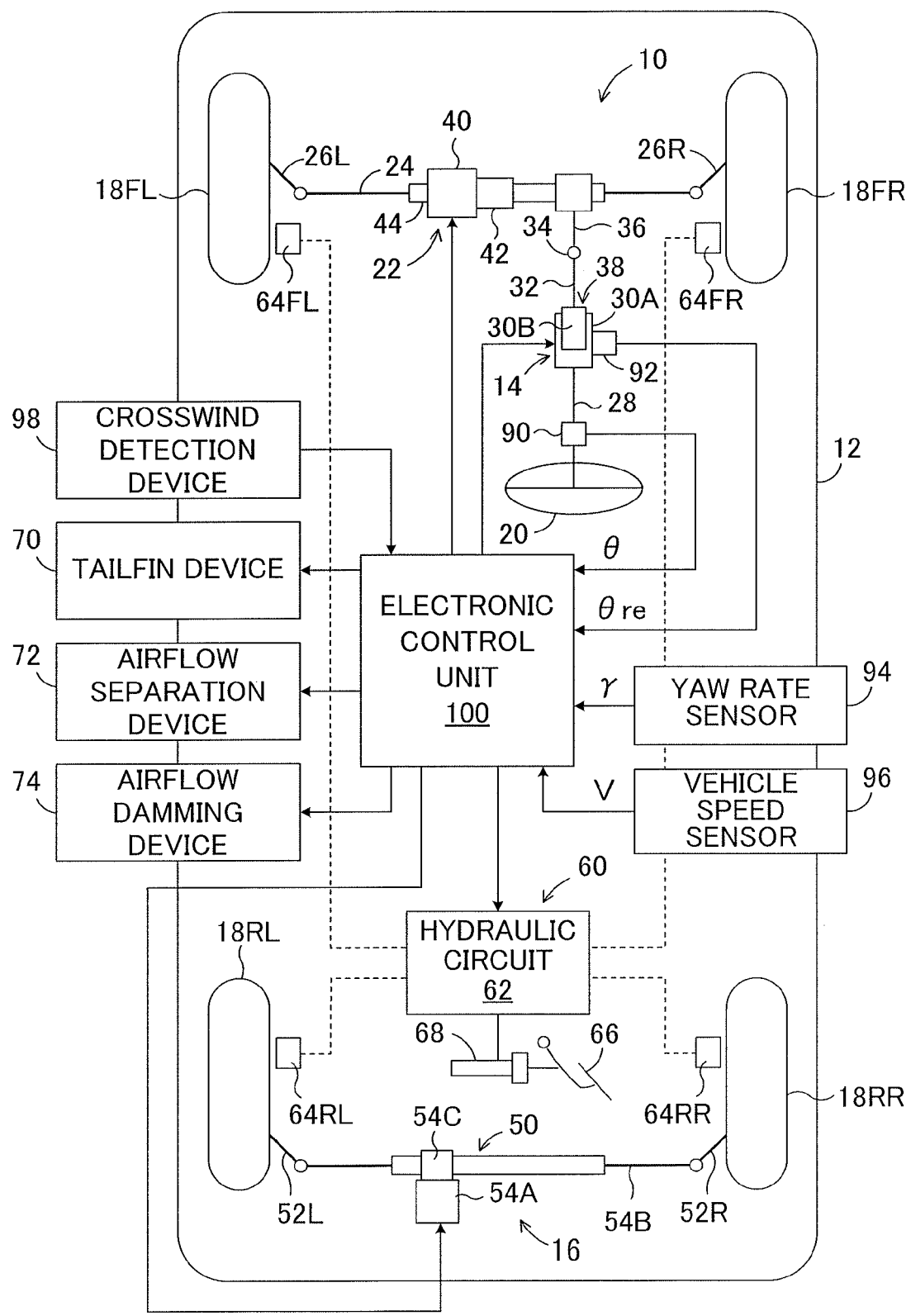
FIG. 1 is a schematic configuration diagram for illustrating a vehicle travel control apparatus according to a first embodiment of the present invention.

In order to promote understanding of embodiments of the present invention, before a description of the embodiments, a description is given of parameters such as a yaw rate of a vehicle and a lateral force caused by a crosswind in a case in which the crosswind is acting on the vehicle and in a case in which the crosswind is not acting on the vehicle.

<Yaw Rate of Vehicle>

Such a case that while the vehicle is traveling straight at a constant vehicle speed V, the vehicle is receiving a crosswind at a constant wind speed is considered. In this case, a yaw rate $\gamma p$ of the vehicle is represented by Equation (1).

$$\gamma p = \frac{2LK_fK_r(\delta f - \delta r) + (K_f + K_r)(M_{tv} + M_z) + (L_rK_r - L_fK_f)F_y}{\frac{2L^2}{V}K_fK_r + mV(L_rK_r - L_fK_f)} \quad (1)$$

Respective parameters in this equation are described below.

Kf: cornering power of front wheels
Kr: cornering power of rear wheels
L: wheelbase of vehicle
Lf: distance from center of gravity of vehicle to front wheel axle in vehicle longitudinal direction
Lr: distance from center of gravity of vehicle to rear wheel axle in vehicle longitudinal direction
m: mass of vehicle (including a vehicle occupant)
V: vehicle speed
δf: steering angle of front wheels
δr: steering angle of rear wheels
Mtv: yaw moment generated by torque vectoring control
Mz: yaw moment caused by crosswind
Fy: lateral force caused by crosswind Moreover, when the crosswind is not acting on the vehicle, the yaw moment Mz caused by the crosswind and the lateral force Fy caused by the crosswind are 0, and the yaw moment Mtv generated to act against the yaw moment Mz by the torque vectoring control is also 0. Thus, a yaw rate γt of the vehicle in this case is represented by Equation (2). This yaw rate γt is a yaw rate of the vehicle determined by the steering angle δf of the front wheels, the steering angle δr of the rear wheels, and the vehicle speed V in the case in which the crosswind is not acting on the vehicle, and is thus set to a target yaw rate of the vehicle.

$$\gamma t = \frac{2LK_fK_r(\delta f - \delta r)}{\frac{2L^2}{V}K_fK_r + mV(L_rK_r - L_fK_f)} \quad (2)$$

<Parameters Such as Lateral Force Caused by Crosswind>

When the vehicle receives a crosswind at a wind speed W during the travel of the vehicle, an airspeed Va of the crosswind, namely, a relative speed of the crosswind with respect to the vehicle, is a square root of sum of squares of the vehicle speed V and the wind speed W. A yaw moment aerodynamic coefficient and lateral aerodynamic coefficient about the center of gravity of the vehicle are denoted by Cy and Cs, respectively. Moreover, a lift aerodynamic coefficient of the vehicle is denoted by CL, a lift aerodynamic coefficient of the front wheels is denoted by CF, and a lift aerodynamic coefficient of the rear wheels is denoted by CR. Those aerodynamic coefficients are functions of an aerodynamic sideslip angle βa of the crosswind. Further, the density of the air is denoted by ρ, and a projected area of a front of the vehicle is denoted by S.

The lateral force Fy caused by the crosswind, the yaw moment Mz caused by the crosswind, a lift (force upward in the vertical direction) Fz of the vehicle, a lift Fzf of the front wheels, and a lift Fzr of the rear wheels are respectively represented by Equation (3) to Equation (7).

$$F_y = \frac{1}{2}\rho SVa^2 Cs \quad (3)$$

$$M_z = \frac{1}{2}\rho SVa^2 LVa^2 Cy \quad (4)$$

$$F_z = \frac{1}{2}\rho SVa^2 CL \quad (5)$$

$$F_{zf} = \frac{1}{2}\rho SVa^2 CL_f \quad (6)$$

$$F_{zr} = \frac{1}{2}\rho SVa^2 CL_r \quad (7)$$

The cornering power Kf of the front wheels and the cornering power Kr of the rear wheels when the vehicle is receiving the crosswind during the travel are respectively represented by Equation (8) and Equation (9) where the gravitational acceleration is g.

$$K_f = \frac{1}{2}\left(mg\frac{L_r}{L} - F_{zf}\right)C_f \quad (8)$$

$$K_r = \frac{1}{2}\left(mg\frac{L_f}{L} - F_{zr}\right)C_r \quad (9)$$

Further, when a sum of a difference ΔFxf between longitudinal forces (a driving force and a braking force) of the front left and right wheels and a difference ΔFxr between longitudinal forces of the rear left and right wheels is denoted by a longitudinal force difference ΔFx of the left and right wheels, and a tread of the vehicle is denoted by Trd, the yaw moment Mtv of the torque vectoring control is represented by Equation (10).

$$M_{tv} = \Delta F_x f Trd \quad (10)$$

First Embodiment

FIG. 1 is a diagram for illustrating a vehicle travel control apparatus 10 according to a first embodiment of the present invention installed in a vehicle 12. The vehicle 12 includes a steering angle varying device 14 for the front wheels and a rear wheel steering device 16, and the travel control device 10 includes an electronic control unit 100 as control means for controlling the steering angle varying device 14 and the rear wheel steering device 16. The vehicle 12 includes front left and right wheels 18FL and 18FR, which are steered wheels, and rear left and right wheels 18RL and 18RR, which are non-steered wheels. The front left and right wheels 18FL and 18FR are steered via a rack bar 24 and tie rods 26L and 26R by an electric power steering device (EPS) 22 driven in response to an operation by a driver on a steering wheel 20.

The steering wheel 20, which serves as a steering input device, is connected to a pinion shaft 36 of the power steering device 22 via an upper steering shaft 28, the steering angle varying device 14, a lower steering shaft 32, and a universal joint 34. The steering angle varying device 14 includes a motor 38 for steering drive. The motor 38 is coupled to a bottom end of the upper steering shaft 28 on a housing 30A side, and is coupled to a top end of the lower steering shaft 32 via a speed reduction mechanism (not shown) on a rotor 30B side.

The steering angle varying device 14 rotates the upper steering shaft 28 and the lower steering shaft 32 relative to each other, thereby relatively driving the front left and right wheels 18FL and 18FR with respect to the steering wheel 20 for steering. Thus, the steering angle varying device 14 functions as a variable gear ratio steering (VGRS) for changing a steering gear ratio (reciprocal of a steering transmission ratio). Moreover, the steering angle varying device 14 changes the steering angle δf of the front left and right wheels independently of absence/presence of the steering operation by the driver, to thereby change a relationship between a rotational position of the steering wheel 20 and the steering angle of the front wheels. As described in detail later, the steering angle varying device 14 is controlled by a steering angle control unit of the electronic control unit 100.

In the illustrated embodiment, the electric power steering device 22 is an electric power steering device of a rack coaxial type, and includes a motor 40, and a conversion mechanism 42 of, for example, a ball screw type for converting a rotational torque of the motor 40 into a force in a reciprocal direction of the rack bar 24. The electric power steering device 22 is controlled by an EPS control unit of the electronic control unit 100. The electric power steering device 22 functions as a steering assisting force generation device for generating an assisting steering force for relatively driving the rack bar 24 with respect to the housing 44, to thereby reduce a steering load on the driver, and assist in an operation of the steering angle varying device 14.

It should be noted that the EPS control unit of the electronic control unit 100 controls the EPS 22 based on a steering torque MT detected by a steering torque sensor (not shown) and the like, to thereby reduce the steering load on the driver, and assist in controlling the front wheel steering angle by the steering angle varying device 14.

The rear left and right wheels 18RL and 18RR are steered via tie rods 52L and 52R by an electric power steering device 50 of the rear wheel steering device 16 independently of the front left and right wheels 18FL and 18FR. Thus, the rear wheel steering device 16 functions as a rear wheel steering angle varying device for changing the steering angle δr of the rear left and right wheels independently of the steering operation by the driver.

The illustrated rear wheel steering device 16 is an electric assisting steering device having a widely-known configuration, and includes a motor 54A, and a motion conversion mechanism 54C of, for example, a screw type, for converting a rotation of the motor 54A into a reciprocating motion of a relay rod 54B. The relay rod 54B cooperates with the tie rods 52L and 52R, and a knuckle arm (not shown), to construct a steering mechanism for providing a steering drive to the left and right rear wheels 18RL and 18RR through the reciprocating motion of the relay rod 54B.

It should be noted that the steering angle varying device 14 and the rear wheel steering device 16 may have arbitrary configurations as long as the devices can respectively change the steering angles of the front wheels and the rear wheels independently of the steering operation by the driver. Moreover, the steering assisting force generation device may have an arbitrary configuration as long as the steering assisting force generation device can generate the assisting steering force. Further, the steering input device is the steering wheel 20, but the steering input device may be a steering lever of a joystick type.

Braking forces of the respective wheels are controlled by controlling pressures in wheel cylinders 64FL, 64FR, 64RL, and 64RR, namely, braking pressures, by a hydraulic circuit 62 of a braking device 60. The hydraulic circuit 62 includes an oil reservoir, an oil pump, various valve devices, and the like, which are not shown in FIG. 1, and the braking pressures in the respective wheel cylinders are usually controlled by a master cylinder 68 driven in response to a depressing operation on a brake pedal 66 by a driver. Further, the braking pressures in the respective wheel cylinders are individually controlled by a braking force control unit of the electronic control unit 100 controlling the hydraulic circuit 62 depending on necessity. The braking device 60 can respectively control the braking forces of the respective wheels independently of the braking operation by the driver.

The vehicle 12 includes a tailfin device 70, an airflow separation device 72, and an airflow damming device 74 as aerodynamic devices for controlling the travel of the vehicle when the vehicle receives a crosswind during the travel, and operations of those devices are controlled by an aerodynamic device control unit of the electronic control unit 100.

Figure 2:
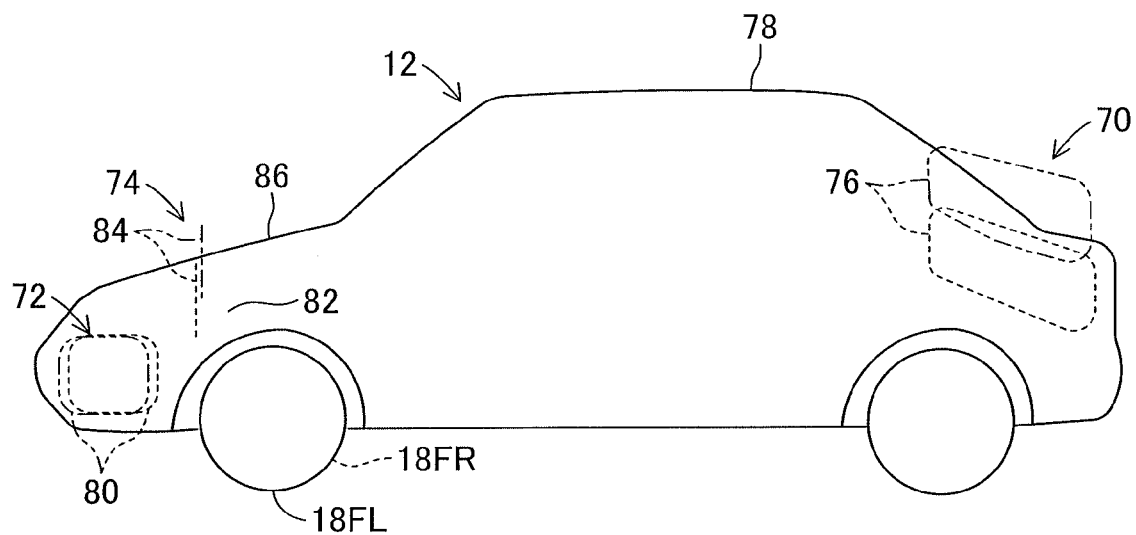
FIG. 2 is a side view for illustrating a vehicle to which the first embodiment is applied.

As illustrated in FIG. 2, the tailfin device 70 includes a pair of vertical fins 76 separated from each other in the lateral direction of the vehicle on a rear end of the vehicle 12, and extending in the longitudinal direction of the vehicle. The pair of vertical fins 76 are configured to be driven by actuators (not shown), to thereby be moved to non-operation positions (broken lines) at which the vertical fins 76 are stored in a vehicle body 78 of the vehicle 12, and to operation positions (long dashed double-short dashed lines) at which the vertical fins 76 protrude upward from the vehicle body 78. As widely known, the tailfin device 70 receives the crosswind on the pair of vertical fins 76, to thereby generate a yaw moment Mtail (not shown) in a direction opposite to the yaw moment Mz acting about a center of gravity G of the vehicle 12 as a result of the crosswind.

Figure 3:
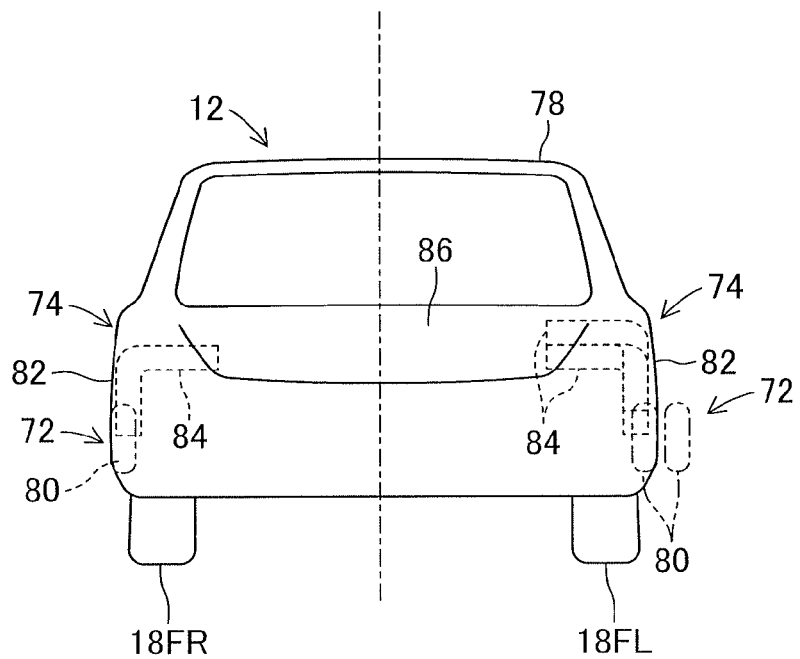
FIG. 3 is a front view for illustrating the vehicle to which the first embodiment is applied.

As illustrated in FIG. 2 and FIG. 3, the airflow separation device 72 includes a pair of airflow separation panels 80 arranged on side surface portions adjacent to a front end of the vehicle 12, and the pair of airflow separation panels 80 have substantially the same shapes as corresponding portions of front fenders 82 of the vehicle 12. The pair of airflow separation panels 80 are configured to be driven by actuators (not shown), to thereby be moved to non-operation positions (solid lines) at which the airflow separation panels 80 are in contact with the front fenders 82, and operation positions (long dashed double-short dashed lines) at which the airflow separation panels 80 are separated from the front fenders 82 outward in the lateral direction of the vehicle.

Figure 6:
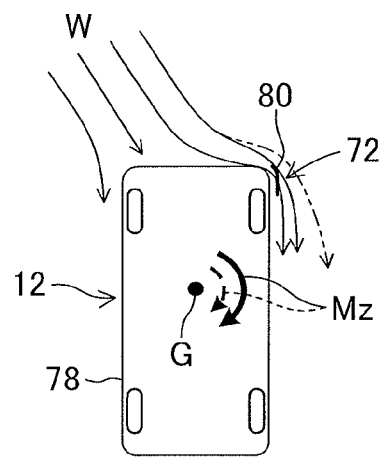
FIG. 6 is an explanatory diagram for illustrating an operation of an airflow separation device when the vehicle receives a crosswind during the travel of the vehicle.

As illustrated in FIG. 6, when the vehicle 12 receives the crosswind W during the travel, the airflow separation device 72 on a leeward side is operated. The airflow separation device 72 uses the airflow separation panel 80 to separate an airflow of the crosswind W from the front end on the leeward side of the vehicle body 78, thereby decreasing an aerodynamic force acting on the front end on the leeward side of the vehicle 12. As a result, the yaw moment Mz caused by the crosswind, and acting on the vehicle 12 decreases, for example, from a yaw moment represented by the solid-line arrow to a yaw moment represented by the broken-line arrow. The same action as that of the airflow separation device 72 may be achieved by injecting compressed air toward a direction away from the vehicle body in the vicinity of the front end on the leeward side of the vehicle 12.

Further, as illustrated in FIG. 2 and FIG. 3, the airflow damming device 74 includes a pair of airflow damming panels 84 separated from each other in the lateral direction of the vehicle on a forward side of the front wheels 18FL and 18FR. Outer edge portions of the pair of airflow damming panels 84 have substantially the same shapes as corresponding portions of the front fenders 82 and a hood 86, and form plates substantially in an L shape extending in the lateral direction and the vertical direction of the vehicle. The pair of airflow damming panels 84 are driven by actuators (not shown), to thereby be moved to non-operation positions (broken lines) at which the airflow damming panels 84 are stored in the vehicle body 78 of the vehicle 12, and operation positions (long dashed double-short dashed lines) at which the airflow damming panels 84 protrude upward from the vehicle body 78 and outward in the lateral direction of the vehicle.

Figure 7:
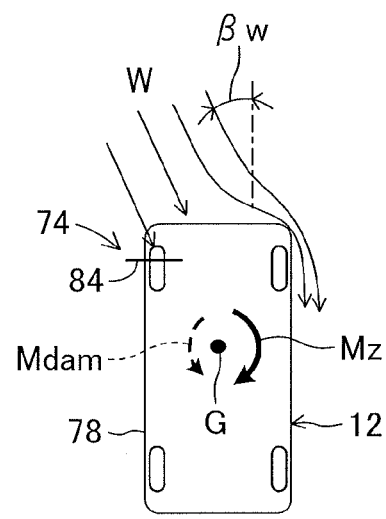
FIG. 7 is an explanatory diagram for illustrating an operation of an airflow damming device when the vehicle receives the crosswind during the travel of the vehicle.

As illustrated in FIG. 7, the airflow damming device 74 uses the airflow damming panels 84 to receive a part of the airflow of the crosswind W, thereby generating a yaw moment Mdam in the opposite direction of the yaw moment Mz caused by the crosswind, and acting about the center of gravity G of the vehicle 12. The yaw moment Mz increases as a yaw angle βw of the crosswind W increases, but the yaw moment Mdam decreases as the yaw angle βw of the crosswind W increases.

A steering angle sensor 90 for detecting a rotational angle of the upper steering shaft as a steering angle θ is provided to the upper steering shaft 28. A rotational angle sensor 92 for detecting the rotational angle of the lower steering shaft 32 with respect to the upper steering shaft 28 as a relative rotational angle θre is provided to the steering angle varying device 14. The steering angle sensor 90 and the rotational angle sensor 92 detect the steering angle θ and the relative rotational angle θre with the steering and the rotation in a left turn direction of the vehicle being respectively considered to be positive.

A signal representing the steering angle θ and a signal representing the relative rotational angle θre are input to the electronic control unit 100 together with a signal representing the vehicle speed V detected by the yaw rate sensor 94 and a signal representing the vehicle speed V detected by the vehicle speed sensor 96. It should be noted that the rotational angle of the lower steering shaft 32 may be detected to acquire the relative rotational angle θre as a difference between the steering angle θ and the rotational angle of the lower steering shaft 32.

Further, signals representing the airspeed Va and the yaw angle βw (an angle of the direction of the relative speed of the crosswind with respect to the forward travel direction of the vehicle, which is positive when the yaw angle is on a right side with respect to the forward travel direction of the vehicle) of the crosswind are input to the electronic control unit 100 from a crosswind detection device 98. The crosswind detection device 98 may be a porous pitot tube, an ultrasonic anemometer, or the like as long as the airspeed Va and the yaw angle βw of the crosswind can be detected.

When the crosswind is not detected by the crosswind detection device 98, the steering angle varying device 14, the rear wheel steering device 16, and the braking device 60 are controlled by the corresponding control units of the electronic control unit 100. Moreover, the tailfin device 70, the airflow separation device 72, and the airflow damming device 74 are maintained in the non-operation positions by the aerodynamic device control unit of the electronic control unit 100.

In contrast, when the crosswind is detected by the crosswind detection device 98, as described later, the steering angle varying device 14 and the like are controlled by the travel control unit of the electronic control unit 100 via the corresponding steering angle control unit and the like, and, as a result, the travel of the vehicle is controlled so as to reduce the influence of the crosswind. It should be noted that, in the following description, the steering angle varying device 14, the rear wheel steering device 16, the braking device 60, the tailfin device 70, the airflow separation device 72, and the airflow damming device 74 are referred to as "devices" depending on necessity. Moreover, when the steering angle varying device 14, the rear wheel steering device 16, and the braking device 60 are controlled by control other than the vehicle travel control, such as steering gear ratio control, a control amount of the travel control is added to a control amount of the control other than the travel control so as to control each device.

Each control unit of the electronic control unit 100 may be a microcomputer including a CPU, a ROM, a RAM, and an input/output port device connected to one another via a bidirectional common bus.

Figure 4:
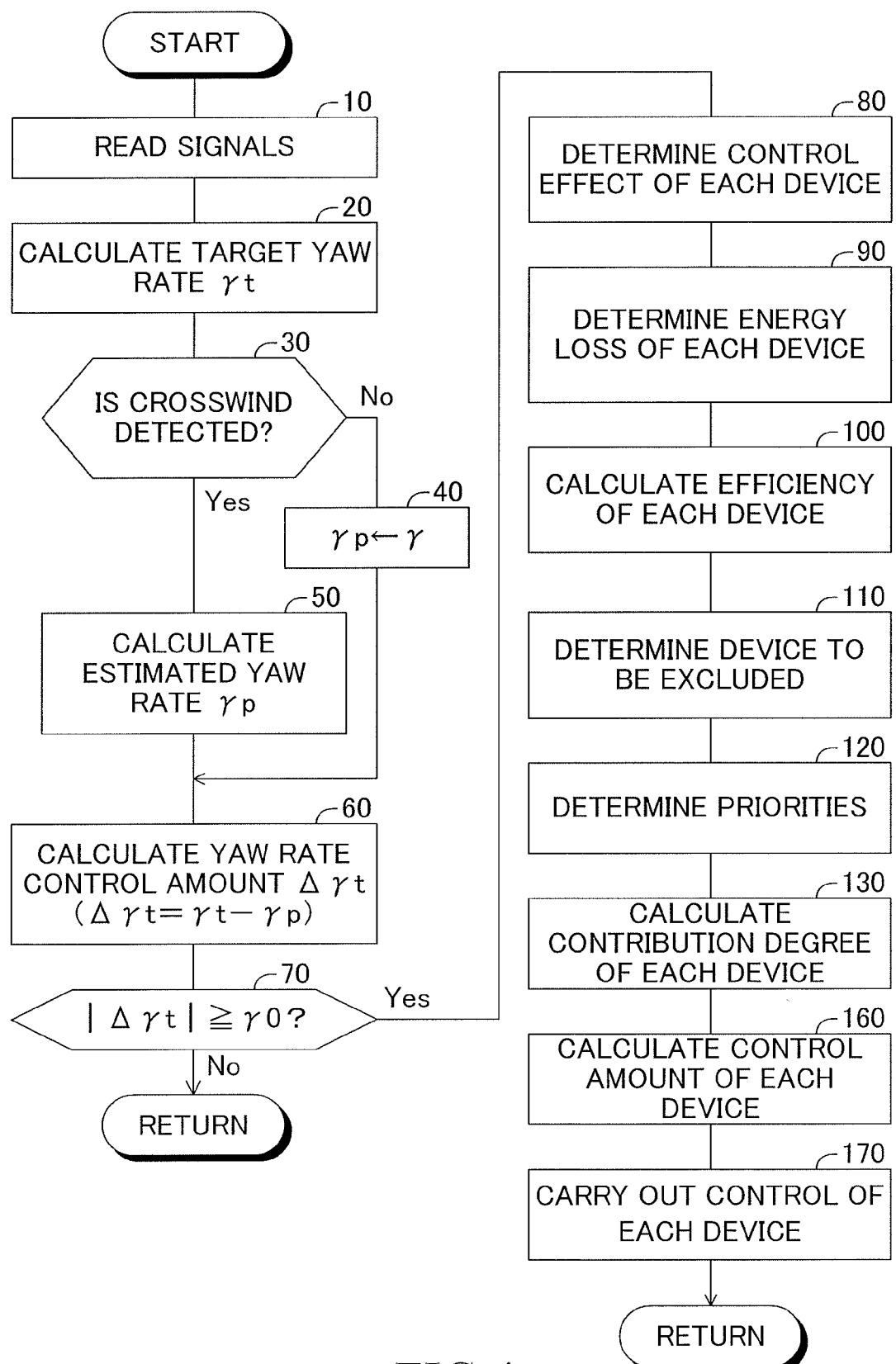
FIG. 4 is a flowchart for illustrating a travel control routine according to the first embodiment.

Referring to a flowchart illustrated in FIG. 4, a description is now given of a travel control routine in the first embodiment. The control in accordance with the flowchart illustrated in FIG. 4 is executed repeatedly at predetermined time periods by the electronic control unit 100 when an ignition switch (not shown), is turned on. It should be noted that, in the following description, the travel control in accordance with the flowchart illustrated in FIG. 4 is simply referred to as "control".

First, in Step 10, the signal representing the steering angle detected by the steering angle sensor 90 and the like are read, and, in Step 20, the target yaw rate γt of the vehicle is calculated in accordance with Equation (2). It should be noted that the steering angle δf of the front wheels in Equation (2) is calculated based on the steering angle θ, the relative rotational angle θre, an arm ratio of a steering system, and the like.

In Step 30, whether or not the crosswind is detected by the crosswind detection device 98 is determined. In this case, in a state in which the vehicle speed V is equal to or more than a reference value V0 (positive constant), when absolute values of the airspeed Va and yaw angle βa of the crosswind detected by the crosswind detection device 98 are respectively equal to or more than reference values Va0 and βa0 (both are positive constants), it may be determined that the crosswind is detected. When an affirmative determination is made, the control proceeds to Step 50, and when a negative determination is made, in Step 40, an estimated yaw rate γp of the vehicle is set to the yaw rate γ detected by the yaw rate sensor.

In Step 50, the parameters such as the yaw moment Mz caused by the aerodynamic force are calculated in accordance with Equation (3) to Equation (10), and further, the estimated yaw rate γp of the vehicle is calculated in accordance with Equation (1).

In Step 60, as a deviation γt−γp between the target yaw rate γt of the vehicle and the estimated yaw rate γp of the vehicle, a target yaw rate control amount Δγt, which is a yaw rate control amount required to cause the yaw rate γ of the vehicle to reach the target yaw rate γt, is calculated.

In Step 70, whether or not the absolute value of the target yaw rate control amount Δγt is equal to or more than a reference value γ0 (positive constant), namely, whether or not the control of the yaw rate γ of the vehicle is necessary, is determined. When a negative determination is made, the target control amounts for the respective devices relating to the vehicle travel control are set to 0, and then, the control returns to Step 10. When an affirmative determination is made, the control proceeds to Step 80.

In Step 80, in the current states of the vehicle 12 and the crosswind, a control amount (control effect) for the yaw rate of the vehicle assumed when each device is operated by a predetermined amount set in advance with respect to a current state as a reference is calculated as a yaw rate control amount dγ* of each device. Table 1 to Table 3 are tables for showing the yaw rate control amounts dγ* calculated in this way.

In those tables, FS, RS, and TV used as suffixes * of respective values respectively denote the steering of the front wheels 18FL and 18FR by the steering angle varying device 14, the steering of the rear wheels 18RL and 18RR by the rear wheel steering device 16, and the torque vectoring by the control of the braking forces by the braking device 60. Moreover, A, B, and C used as the suffixes * respectively denote the operations of the tailfin device 70, the airflow separation device 72, and the airflow damming device 74. Further, AB used as the suffix * denotes the operations of the tailfin device 70 and the airflow separation device 72, and ABC denotes the operations of the tailfin device 70, the airflow separation device 72, and the airflow damming device 74.

It should be noted that the control of Table 1, namely, the steering of the front wheels by the steering angle varying device 14, the steering of the rear wheels by the rear wheel steering device 16, and the torque vectoring by the control of the braking forces of the braking device 60 apply actions of the control to the wheels, which are unsprung parts, to thereby control the yaw rate of the vehicle. In contrast, the control of Table 2 and Table 3, namely, the control by the operations of the tailfin device 70, the airflow separation device 72, and the airflow damming device 74 apply actions of the control to the vehicle body, which is a sprung part, to thereby control the yaw rate of the vehicle.

TABLE 1

|  |  | Front wheel steering | Rear wheel steering | Torque vectoring |
|---|---|---|---|---|
| Yaw rate control amount dγ* |  | dγ$_{FS}$ | dγ$_{RS}$ | dγ$_{TV}$ |
| Energy loss | Energy consumed by operation | dE$_{FSP}$ | dE$_{RSP}$ | dE$_{TVP}$ |
|  | Loss caused by change in air resistance | 0 | 0 | 0 |
|  | Loss caused by change in vertical load | 0 | 0 | 0 |
|  | Loss caused by change in slip angle | dE$_{FSR}$ | dE$_{RSR}$ | 0 |
|  | Total of losses | dE$_{FS}$ | dE$_{RS}$ | dE$_{TV}$ |

TABLE 2

|  |  | Tailfin | Airflow separation | Airflow damming |
|---|---|---|---|---|
| Yaw rate control amount dγ* |  | dγ$_A$ | dγ$_B$ | dγ$_C$ |
| Energy loss | Energy consumed by operation | dE$_{AP}$ | dE$_{BP}$ | dE$_{CP}$ |
|  | Loss caused by change in air resistance | dE$_{ACD}$ | dE$_{BCD}$ | dE$_{CCD}$ |
|  | Loss caused by change in vertical load | dE$_{AVL}$ | dE$_{BVL}$ | dE$_{CVL}$ |
|  | Loss caused by change in slip angle | 0 | 0 | 0 |
|  | Total of losses | dE$_A$ | dE$_B$ | dE$_C$ |

TABLE 3

|  |  | Tailfin + airflow separation | Tailfin + airflow separation + airflow damming |
|---|---|---|---|
| Yaw rate control amount dγ* |  | dγ$_{AB}$ | dγ$_{ABC}$ |
| Energy loss | Energy consumed by operation | dE$_{AB}$ | dE$_{ABC}$ |
|  | Loss caused by change in air resistance | dE$_{AB}$ | dE$_{ABC}$ |
|  | Loss caused by change in vertical load | dE$_{AB}$ | dE$_{ABC}$ |
|  | Loss caused by change in slip angle | 0 | 0 |
|  | Total of losses | dE$_{AB}$ | dE$_{ABC}$ |

In Step 90, as shown in Table 1 to Table 3, an energy loss amount dE* assumed when each device is operated by the predetermined amount set in advance with respect to the current state as the reference is calculated. It should be noted that the predetermined amount may be a constant value set in advance for each device. For example, a constant steering angle change amount of the front wheels may be set for the steering angle varying device 14, a constant steering angle change amount of the rear wheels may be set for the rear wheel steering device 16, a constant driving force difference between the left and right wheels may be set for the braking device 60, and a change between the non-operation position and the operation position may be set for the aerodynamic device. However, the predetermined amount may be the maximum amount permitted to operate each device from the current operation state. Further, for the steering angle varying device 14, the rear wheel steering device 16, and the braking device 60, the predetermined amount may be a value necessary to operate the device so that each of the yaw rate control amounts dγ$_{FS}$, dγ$_{RS}$, and dγ$_{TV}$, and the like reaches a constant value dγ0 set in advance and common to all the devices.

For example, for the steering angle device 14 and the rear wheel steering device 16, based on a relationship between the operation amount of the device and a consumed energy acquired in advance, energies dE$_{FSP}$ and dE$_{RSP}$ consumed to operate the respective devices are calculated. Moreover, slip angles βf and βr of the front wheels and the rear wheels are calculated, and energy loss amounts dE$_{FSR}$ and dE$_{RSR}$ caused by changes in the rolling resistances of the wheels as a result of changes in the slip angles of the front wheels and the rear wheels are calculated in accordance with Equation (11) and Equation (12). Further, respective sums of the consumed energies dE$_{FSP}$ and dE$_{RSP}$ and the energy loss amounts dE$_{FSR}$ and dE$_{RSR}$ are calculated as energy loss amounts dE$_{FS}$ and dE$_{RS}$ of the steering angle varying device 14 and the rear wheel steering device 16.

$$d_{FSR} = K_{sf} V \sin(\beta f + \delta f) \tag{11}$$

$$d_{RSR} = K_{sf} V \sin(\beta f + \delta r) \tag{12}$$

For the braking device 60, an energy dE$_{TVP}$ consumed to operate the braking device 60 to provide a driving force difference set in advance between the left and right wheels is calculated, and the value thereof is set to an energy loss amount dE$_{TV}$ of the braking device 60.

As shown in Table 2, for the tailfin device 70, the airflow separation device 72, and the airflow damming device 74, based on data acquired in advance by a wind tunnel test or the like, energies dE$_{AP}$, dE$_{BP}$, and dE$_{CP}$ consumed to operate those aerodynamic devices are calculated. Moreover, based on data acquired in advance, energy loss amounts dE$_{ACD}$, $dE_{BCD}$, and $dE_{CCD}$ caused by changes in the air resistance as a result of the operations of those aerodynamic devices are calculated.

Moreover, based on data acquired in advance, energy loss amounts $dE_{AVL}$, $dE_{BVL}$, and $dE_{CVL}$ caused by changes in vertical loads of the wheels as a result of the operations of those aerodynamic devices are calculated. Further, respective sums of the consumed energies $dE_{AP}$, $dE_{BP}$, and $dE_{CP}$, the energy loss amounts $dE_{ACD}$, $dE_{BCD}$, and $dE_{CDD}$, and the energy loss amounts $dE_{AVL}$, $dE_{BVL}$, and $dE_{CVL}$ are calculated as energy loss amounts $dE_A$, $dE_B$, and $dE_C$ of the tailfin device 70, the airflow separation device 72, and the airflow damming device 74.

As shown in Table 3, for the case in which the tailfin device 70 and the airflow separation device 72 are operated, and also for the case in which the tailfin device 70, the airflow separation device 72, and the airflow damming device 74 are operated, the energy loss amount $dE_{AB}$ and $dE_{ABC}$ are similarly calculated.

In the calculation of the control effect of each device in Step 80 and the calculation of the energy loss amount of each device in Step 90, it is preferred that an operation direction of each device be considered based on the sign of the target yaw rate control amount $\Delta\gamma t$. For example, for the steering angle varying device 14 and the rear wheel steering device 16, it is preferred that whether the operation direction increases or decreases the steering angles of the wheels be considered, and, for the braking device 60, whether the operation direction increases or decreases the braking force be considered. Further, for the tailfin device 70, the airflow separation device 72, and the airflow damming device 74, it is preferred that whether the vertical fins 76 and the like are moved from the non-operation positions to the operation positions or moved from the operation positions to the non-operation positions be considered.

In Step 100, for each device, a value $d\gamma^*/dE^*$ acquired by dividing the control amount $d\gamma^*$ for each device by the energy loss mount $dE^*$ is calculated as an efficiency $EF^*$ of each device.

When the device is operated to an upper limit of an operation range thereof, the device cannot be controlled any more to increase the operation. In Step 110, a device that cannot be controlled to increase the operation so that the yaw rate $\gamma$ of the vehicle approaches the target yaw rate $\gamma t$ is determined as a device to be excluded from a subject of determination of a priority in Step 120 described later. For example, in a state in which operation of the tailfin device 70 for controlling the vertical fins 76 between the operation positions and the non-operation positions is preferred, when the vertical fins 76 are already in the operation positions, the tailfin device 70 is determined as the device to be excluded.

In Step 120, for the devices other than the devices that are determined to be excluded in Step 110, the priority of each device is determined based on the efficiency $EF^*$ so that a higher priority is assigned to a higher efficiency $EF^*$.

In Step 130, for all the devices for which the priorities have been determined, a contribution degree D of each device is calculated as a ratio of the control amount of the yaw rate $\gamma$ of the vehicle by the device to the control amount of the device.

For example, a denominator of Equation (1) is set to Fb as in Equation (13), and Ff and Fr are respectively defined by Equation (14) and Equation (15).

$$Fb = \frac{2L^2}{V} KfKr + mV(LrKr - LfKf) \quad (13)$$

$$Ff = \frac{\frac{dFb}{dKf}}{Fb} \quad (14)$$

$$Fr = \frac{\frac{dFb}{dKr}}{Fb} \quad (15)$$

The steering angle varying device 14 and the rear wheel steering device 16 respectively control the steering angle $\delta f$ of the front wheels and the steering angle $\delta r$ of the rear wheels, and the contribution degrees D of the steering angle varying device 14 and the rear wheel steering device 16 are respectively represented by Equation (16) and Equation (17).

$$\frac{\partial\gamma}{\partial\delta f} = \frac{2LKfKr}{Fb} \quad (16)$$

$$\frac{\partial\gamma}{\partial\delta r} = \frac{2LKfKr}{Fb} \quad (17)$$

The braking device 60 uses the driving force difference between the left and right wheels to control the yaw moment Mtv exerted on the vehicle, and the contribution degree D of the braking device 60 is thus represented by Equation (18).

$$\frac{\partial\gamma}{\partial Mtv} = \frac{(Kf + Kr)}{Fb} \quad (18)$$

Further, if the aerodynamic yaw moment Mz and the aerodynamic lateral force Fy are controlled, the contribution degrees thereof are respectively represented by Equation (19) and Equation (20). Thus, the contribution degrees D of the tailfin device 70, the airflow separation device 72, and the airflow damming device 74 are determined based on Equation (19), or on Equation (19) and Equation (20).

$$\frac{\partial\gamma}{\partial Mz} = \frac{(Kf + Kr)}{Fb} \quad (19)$$

$$\frac{\partial\gamma}{\partial Fy} = \frac{(LrKr - LfKf)}{Fb} \quad (20)$$

In Step 160 carried out immediately after Step 130, calculation is carried out such that a control amount for causing the yaw rate $\gamma$ of the vehicle to reach the target yaw rate $\gamma t$ is distributed in descending order of the priority.

For example, it is assumed that the contribution degree of the device highest in the priority to the control of the yaw rate $\gamma$ of the vehicle is D1, and the maximum possible current control amount for this device is C1max. Then, a control amount $\Delta\gamma 1$max of the yaw rate $\gamma$ achieved by controlling this device by the maximum control amount C1max is represented as D1C1 max. When the magnitude of the control amount $\Delta\gamma 1$max is equal to or more than the magnitude of the target yaw rate control amount $\Delta\gamma t$ calculated in Step 60, control can be carried out such that the target yaw rate control amount $\Delta\gamma t$ is attained only by this device. Thus, the value acquired by dividing the target yaw rate control amount $\Delta\gamma t$ by the contribution degree D1 is determined as the control amount C1 of this device, and the control amounts of the other devices are set to 0.

In contrast, when the magnitude of the control amount $\Delta\gamma1\mathrm{max}$ is less than the magnitude of the target yaw rate control amount $\Delta\gamma t$, the control cannot be carried out such that the target yaw rate control amount $\Delta\gamma t$ is attained only by this device. Thus, the control amount C1 of this device is determined to be C1max. Then, a value $\Delta\gamma t-D1C1\mathrm{max}$ acquired by subtracting the yaw rate control amount D1C1max attained by this device from the target yaw rate control amount $\Delta\gamma t$ is calculated as a residual target yaw rate control amount $\Delta\gamma t2$.

Now, it is assumed that the contribution degree of the device second highest in the priority to the control of the yaw rate $\gamma$ of the vehicle is D2, and the maximum current control amount for this device is C2max. A control amount $\Delta\gamma2\mathrm{max}$ of the yaw rate $\gamma$ achieved by controlling this device by the maximum control amount C2max is represented as D2C2max. When the magnitude of the control amount $\Delta\gamma2\mathrm{max}$ is equal to or more than the magnitude of the residual target yaw rate control amount $\Delta\gamma t2$, control can be carried out such that the target yaw rate control amount $\Delta\gamma t2$ is attained only by this device. Thus, the value acquired by dividing the target yaw rate control amount $\Delta\gamma t2$ by the contribution degree D2 is determined as the control amount C2 of this device, and the control amounts of the devices third or lower in the priority are set to 0.

In contrast, when the magnitude of the control amount $\Delta\gamma2\mathrm{max}$ is less than the magnitude of the residual target yaw rate control amount $\Delta\gamma t2$, the control cannot be carried out such that the residual target yaw rate control amount $\Delta\gamma t2$ is attained only by this device. Thus, the control amount C2 of this device is determined to be C2max. Then, a value $\Delta\gamma t2-D2C2\mathrm{max}$ acquired by subtracting the yaw rate control amount D2C2max attained by this device from the residual target yaw rate control amount $\Delta\gamma t2$ is calculated as a residual target yaw rate control amount $\Delta\gamma t3$. Subsequently, in the same manner, the control amounts of the devices third or lower in the priority are sequentially determined.

In Step 170, each of the devices whose control amount calculated in Step 170 is not 0 is controlled to attain each corresponding control amount, and, as a result, the travel of the vehicle is controlled so that the yaw rate $\gamma$ of the vehicle reaches the target yaw rate $\gamma t$.

According to the first embodiment, in Step 20 to Step 60, the target control amount $\Delta\gamma t$ of the yaw rate for causing the yaw rate $\gamma$ of the vehicle to approach the target yaw rate $\gamma t$ is calculated. Moreover, in Step 80 to Step 100, for each device, the ratio of the change amount of the yaw rate to the energy loss amount caused by the operation is calculated as the efficiency. Further, in Step 110 to Step 160, by sequentially distributing as large target control amounts as possible to the respective devices in descending order of the efficiency, the individual target control amounts are calculated for the plurality of devices, and, in Step 170, each device is controlled based on the individual target control amount.

Thus, the target control amount $\Delta\gamma t$ of the yaw rate as the target control amount for the entire vehicle can sequentially be distributed to the plurality of devices in the manner that the device having a higher efficiency is assigned a higher priority. Thus, compared with the related-art travel control device that does not consider the energy loss caused by the operations of the devices, the ratio of the change amount of the yaw rate to the energy loss amount, which is caused when the yaw rate of the vehicle is caused to approach the target yaw rate, can be increased. In other words, the yaw rate of the vehicle can be caused to approach the target yaw rate with as small an energy loss amount as possible, and as effectively as possible.

Figure 8:
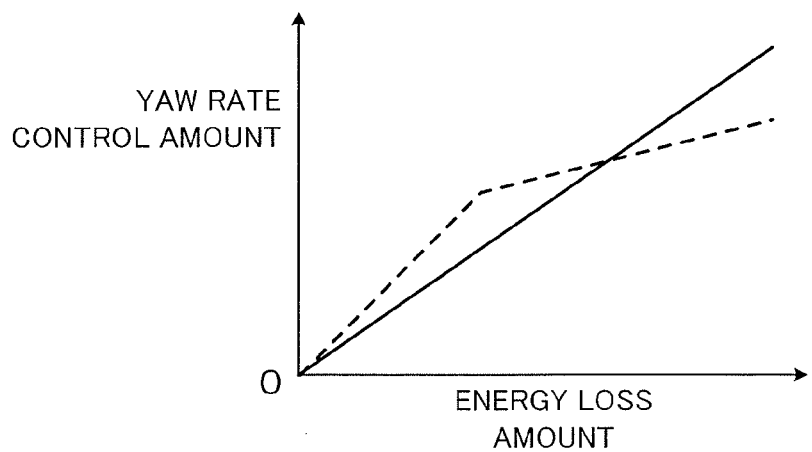
FIG. 8 is a graph for showing a case (solid line) in which a relationship between an energy loss amount and a yaw rate control amount is linear, and a case (broken line) in which the relationship varies depending on a section.

It should be noted that a relationship between the energy loss amount and the yaw rate control amount (control effect) is generally linear as represented by the solid line of FIG. 8. However, as represented by the broken line of FIG. 8, some devices having different ratios of the control effect to the energy loss amount depending on the section. For example, in the control of the steering angle of the vehicle, when the slip angles of the wheels increase, the ratio of the yaw rate control amount to the increase in the slip angle decreases, and the ratio of the control effect to the energy loss amount decreases as the energy loss amount or the control effect increases.

According to the first embodiment, the control effect and the energy loss amount of each device in Steps 80 and 90 are calculated while the current state of the device is considered as the reference. Thus, even for a device having the relationship between the control effect and the energy loss amount as represented by the broken line of FIG. 8, the efficiency EF* of the device can be correctly calculated based on the current state of the device.

Second Embodiment

Figure 5:
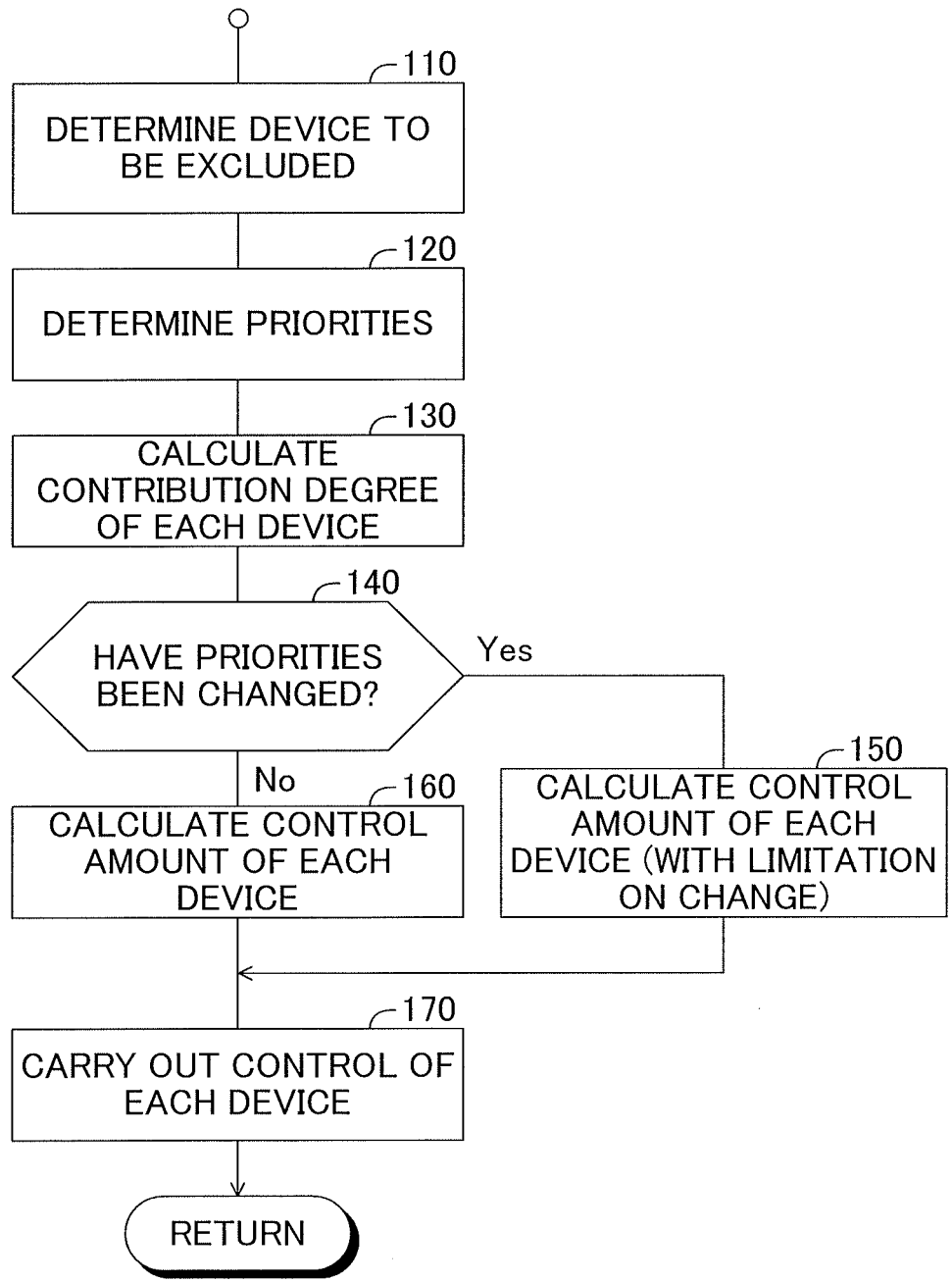
FIG. 5 is a flowchart for illustrating a principal part of a travel control routine of a vehicle travel control apparatus according to a second embodiment of the present invention.

FIG. 5 is a flowchart for illustrating a principal part of a travel control routine of a vehicle travel control apparatus according to a second embodiment of the present invention.

According to the second embodiment, Step 10 to Step 130 are carried out as in the first embodiment. When Step 130 is completed, the control proceeds to Step 140, and whether or not the priority of each device has changed from that of the previous time is determined. When a negative determination is made, the control proceeds to Step 160, and Step 160 is carried out as in the first embodiment. In other words, the control amount for causing the yaw rate $\gamma$ of the vehicle to reach the target yaw rate $\gamma t$ is calculated by sequentially distributing the control amount to each device in descending order of the priority for each device.

In contrast, when an affirmative determination is made, in Step 150, calculation is carried out such that the target yaw rate control amount is sequentially distributed in descending order of the priority for each device, but a change amount from the previous time of each control amount is limited. For example, assuming that a control amount of a certain device for the previous time is Cxf and the control amount calculated in the manner of Step 160 is Cxp, when a magnitude of a deviation Cxp−Cxf is equal to or less than a change limitation value $\Delta$Cx, the control amount for the current time is set to Cxp. However, when the magnitude of the deviation Cxp−Cxf exceeds the change limitation value $\Delta$Cx, the control amount Cx for the current time is set so that an increase/decrease change amount from the control amount Cxf for the previous time is the change limitation value $\Delta$Cx.

It should be noted that even when the priority of the device has not changed from the previous time, if the magnitude of a deviation Cxp−Cxf for the previous time exceeds the change limitation value Cx, in Step 140, the affirmative determination is made, and Step 150 is carried out, which is not shown in FIG. 5. In other words, when the priority of the device changes, Step 150 is carried out until the magnitude of the deviation Cxp−Cxf becomes equal to or less than the change limitation value Cx, resulting in a limitation on the change in the control amount of the device whose priority is changed.

According to the second embodiment, even when the priority changes, the control amount Cx is prevented from rapidly changing before and after the change in the priority, and, compared with the first embodiment, the control of the yaw rate of the vehicle can be stably carried out.

The specific embodiments of the present invention are described in detail above. However, the present invention is not limited to the above-mentioned embodiments. It is apparent for those skilled in the art that various other embodiments may be employed within the scope of the present invention.

For example, in the respective embodiments, the plurality of travel motion state control devices are the steering angle varying device 14, the rear wheel steering device 16, the braking device 60, the tailfin device 70, the airflow separation device 72, and the airflow damming device 74, but the travel motion state control devices are not limited thereto. In other words, any of those devices may be omitted, and there may be added a device, such as a front horizontal fin device and/or a rear horizontal fin device, for changing the vertical loads of the wheels to change the cornering forces, thereby controlling the yaw moment of the vehicle.

Moreover, in the respective embodiments, the travel motion state of the vehicle is the yaw rate of the vehicle, and the target travel motion state is the target yaw rate of the vehicle, but the travel motion state of the vehicle may be a vehicle state other than the single yaw rate. For example, the travel motion state of the vehicle may be a combination of the yaw rate of the vehicle and the lateral acceleration of the vehicle.

Moreover, in the respective embodiments, the vectoring is achieved by the braking device 60 imparting the braking forces to the wheels. However, the vectoring may be achieved by control of the driving force distribution between the left and right driven wheels, or by both of the imparting of the braking forces and the control of the distribution of the driving forces.

Moreover, in the respective embodiments, the external force acting on the vehicle is the aerodynamic force of the crosswind, but the vehicle travel control apparatus according to the present invention may be applied to a case in which, in a state in which an external force other than the aerodynamic force of the crosswind is acting on the vehicle, the travel motion state of the vehicle is caused to approach the target travel motion state.

Moreover, in the respective embodiments, a case in which the driver carries out emergency steering or emergency braking is not mentioned. However, when such an emergency state is detected, the vehicle travel control according to the present invention may be interrupted.

What is claimed is:

1. A vehicle travel control apparatus, comprising:
    a plurality of travel motion state control devices for operating so as to cause a travel motion state of a vehicle to approach a target travel motion state wherein the travel motion state of the vehicle comprises a yaw rate of the vehicle, and the target travel motion state comprises a target yaw rate of the vehicle; and
    control unit for controlling the operations of the plurality of travel motion state control devices,
    wherein the control unit calculates a control amount for causing the travel motion state of the vehicle to approach the target travel motion state as a target control amount for the entire vehicle, sequentially distributes, while setting a ratio of a change amount of the travel motion state to an energy loss amount caused by the operation of each of the plurality of travel motion state control devices as an efficiency, the target control amount for the entire vehicle to the plurality of travel motion state control devices in descending order of the efficiency, to thereby calculate individual target control amounts for the plurality of travel motion state control devices, and controls the operation of the each of the plurality of travel motion state control devices based on each of the individual target control amounts.

2. A vehicle travel control apparatus according to claim 1, wherein the control unit calculates, based on a travel state of the vehicle and an operation state of the each of the plurality of travel motion state control devices, the energy loss amount and the change amount of the travel motion state that are obtained when the each of the plurality of travel motion state control devices is operated at a control amount, which is set in advance.

3. A vehicle travel control apparatus according to claim 1, wherein the control unit is configured to:
    set, when the target control amount for the entire vehicle is not more than a maximum value that is distributable to one of the plurality of travel motion state control devices highest in the efficiency, the target control amount for the entire vehicle to the individual target control amount for the one of the plurality of travel motion state control devices; and
    distribute, when the target control amount for the entire vehicle is more than the maximum value that is distributable to the one of the plurality of travel motion state control devices highest in the efficiency, a difference between the target control amount for the entire vehicle and the maximum value, as a residual target control amount, to another of the plurality of travel motion state control devices second highest in the efficiency.

4. A vehicle travel control apparatus according to claim 1, wherein, when the descending order of the efficiency changes, the control unit limits a change in the individual target control amount for the each of the plurality of travel motion state control devices before and after the change.

5. A vehicle travel control apparatus according to claim 1, wherein the plurality of travel motion state control devices comprise any of a device for controlling a steering angle of a front wheel, a device for controlling a steering angle of a rear wheel, a device for controlling a braking/driving force difference between a left wheel and a right wheel, and a device for using an aerodynamic force to control a yaw moment of the vehicle.

* * * * *